United States Patent
Zeng et al.

(10) Patent No.: US 9,717,016 B2
(45) Date of Patent: Jul. 25, 2017

(54) METHOD FOR ENSURING UPLINK QUALITY OF SERVICE, BASE STATION AND USER EQUIPMENT

(71) Applicant: Huawei Technologies Co., Ltd., Shenzhen, Guangdong (CN)

(72) Inventors: Qinghai Zeng, Shenzhen (CN); Aiqin Zhang, Shenzhen (CN); Lingyun Lei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 14/153,915

(22) Filed: Jan. 13, 2014

(65) Prior Publication Data
US 2014/0126363 A1 May 8, 2014

Related U.S. Application Data

(63) Continuation of application No. PCT/CN2012/078657, filed on Jul. 14, 2012.

(30) Foreign Application Priority Data

Jul. 15, 2011 (CN) .......................... 2011 1 0199187

(51) Int. Cl.
*H04W 28/02* (2009.01)
*H04W 28/12* (2009.01)
(Continued)

(52) U.S. Cl.
CPC ... *H04W 28/0268* (2013.01); *H04W 28/0205* (2013.01); *H04W 28/12* (2013.01);
(Continued)

(58) Field of Classification Search
CPC ............. H04W 28/0268; H04W 28/12; H04W 72/1284
See application file for complete search history.

(56) References Cited

U.S. PATENT DOCUMENTS 7,907,914 B2 * 3/2011 Usuda ................ H04L 47/10
455/422.1
7,948,936 B2 * 5/2011 Lohr .................. H04L 12/5693
370/230
(Continued)

FOREIGN PATENT DOCUMENTS

CN       101141671 A       3/2008
CN       102036131 A       4/2011
(Continued)

OTHER PUBLICATIONS

"3$^{rd}$ Generation Partnership Project; Technical Specification Group Core Network and Terminals; Policy and Charging Control signalling flows and Quality of Service (QoS) parameter mapping (Release 10)," 3GPP TS 29.213, V10.2.0, pp. 1-140, 3$^{rd}$ Generation Partnership Project, Valbonne, France (Jun. 2011).
(Continued)

*Primary Examiner* — Rasheed Gidado
(74) *Attorney, Agent, or Firm* — Leydig, Voit & Mayer, Ltd.

(57) ABSTRACT

Embodiments of the present invention provide a method for ensuring uplink quality of service, a base station and a user equipment. The method for ensuring the uplink quality of service includes: receiving a downlink service data flow, where the downlink service data flow carries an uplink transmission control identifier; and controlling, based on the uplink transmission control identifier, a transmission of a service type's uplink data for which an uplink transmission control needs to be performed in an uplink radio bearer, so as to reduce a transmission rate of the service type's uplink data. Through the technical solution provided by embodiments of the present invention, data is recognized in a dedicated radio bearer and controlled when a centralized
(Continued)

scheduling is adopted for uplink resources, thereby ensuring the uplink quality of service.

12 Claims, 6 Drawing Sheets

(51) Int. Cl.
*H04W 72/12* (2009.01)
*H04W 28/22* (2009.01)
*H04W 76/02* (2009.01)

(52) U.S. Cl.
CPC ........ *H04W 28/22* (2013.01); *H04W 72/1284* (2013.01); *H04W 72/1289* (2013.01); *H04W 76/023* (2013.01)

(56) References Cited

U.S. PATENT DOCUMENTS

| | | | | |
|---|---|---|---|---|
| 8,279,841 | B2* | 10/2012 | Furuta | H04L 69/161 370/338 |
| 8,600,397 | B2* | 12/2013 | Ishii | H04W 28/18 370/328 |
| 8,913,509 | B2* | 12/2014 | Kamdar | H04L 41/5022 370/252 |
| 2005/0185655 | A1* | 8/2005 | Blanc | H04W 28/16 370/395.41 |
| 2005/0286540 | A1* | 12/2005 | Hurtta | H04M 7/006 370/401 |
| 2007/0104131 | A1* | 5/2007 | Puthenkulam | H04L 1/0003 370/329 |
| 2008/0146241 | A1* | 6/2008 | Das | H04L 1/0002 455/450 |
| 2010/0178941 | A1* | 7/2010 | Chun | H04L 1/1832 455/458 |
| 2010/0260129 | A1* | 10/2010 | Ulupinar | H04L 12/4633 370/329 |
| 2011/0235605 | A1* | 9/2011 | Yeoum | H04W 72/04 370/329 |
| 2012/0039306 | A1* | 2/2012 | Hayashi | H04L 1/1887 370/336 |
| 2012/0057547 | A1* | 3/2012 | Lohr | H04L 5/0007 370/329 |

FOREIGN PATENT DOCUMENTS

| | | |
|---|---|---|
| JP | 2006279615 A | 10/2006 |
| JP | 2011524129 A | 8/2011 |
| JP | 2012523144 A | 9/2012 |
| JP | 2013512603 A | 4/2013 |
| KR | 100924309 B1 | 11/2009 |
| WO | WO 0028701 A1 | 5/2000 |
| WO | WO 2009148539 A1 | 12/2009 |
| WO | WO 2010112077 A1 | 10/2010 |
| WO | WO 2011050540 A1 | 5/2011 |
| WO | WO 2011076384 A1 | 6/2011 |

OTHER PUBLICATIONS

"SAE Bearer Management Procedures on S1," 3GPP TSG-RAN WG3 Meeting #55-bis, St. Julian, Malta, R3-070638, $3^{rd}$ Generation Partnership Project, Valbonne, France (Mar. 27-30, 2007).

"Uplink TFT in the Serving GW," 3GPP TSG-SA2 Meeting #63, Change Request 23.402 CR 0118, Athens, Greece, S2-081709, $3^{rd}$ Generation Partnership Project, Valbonne, France (Feb. 18-22, 2008).

Communication in corresponding European Patent Application No. 12814576.0 (Nov. 17, 2016).

* cited by examiner

METHOD FOR ENSURING UPLINK QUALITY OF SERVICE, BASE STATION AND USER EQUIPMENT

CROSS REFERENCE TO RELATED APPLICATIONS

This application is a continuation of International Patent Application No. PCT/CN2012/078657, filed on Jul. 14, 2012, which claims priority to Chinese Patent Application No. 201110199187.9, filed on Jul. 15, 2011, both of which are hereby incorporated by reference in their entireties.

TECHNICAL FIELD

The present invention relates to the field of communication technology and, in particular, to a method for ensuring uplink quality of service, a base station and a user equipment.

BACKGROUND

The long term evolved (Long Term Evolved, LTE) network aims to provide an evolved network that can decrease the time delay, improve the user data rate, enhance the system capacity and the system coverage, and reduce the overall cost of network operators. However, with a rapid popularization of the smart phone and the panel computer, a peer-to-peer (Peer-to-Peer, P2P) application emerges in the mobile network. The P2P technique enables the users to connect to computers of other users directly to exchange files with no need of connecting to the server for browsing and downloading, therefore the server bottleneck problem is eliminated. The P2P technique is quickly spread to service fields such as downloading files and flow media. Currently, the traffic of P2P services presents an unceasingly ascending trend, and brings great pressure to the network broadband.

In addition to the P2P service, there are also various services such as hyper text transfer protocol (Hyper Text Transfer Protocol, http) browsing, wireless application protocol (Wireless Application Protocol, WAP) browsing, electronic mail (Electronic Mail, E-mail) and online chat existed in the existing network. If the P2P service is multiplexed with other services such as http browsing and WAP browsing in the same dedicated radio bearer, it may lead to a result that other services have few available air-interface resources, or even no air-interface resource can be obtained by other services and, thus, may make the user experience on other services very poor.

Currently, an uplink dedicated radio bearer (Dedicated Radio Bearer, DRB) supported by the LTE has an upper limit. Each uplink DRB corresponds to an uplink logical channel (Logical Channel, LC), and each uplink logical channel corresponds to an uplink transmission buffer. One or a plurality of uplink logical channels are divided into one logical channel group, and each terminal has at most 4 logical channel groups. Taking the logical channel group as a unit, the terminal reports the uplink transmission buffer status (buffer status, BS) to the base station. Taking the logical channel as the minimal unit, the base station performs uplink and downlink scheduling based on the buffer status reported by the terminal, and allocates uplink resources to the terminal. The terminal then allocates the allocated uplink resources to internal uplink logical channels. However, one radio bearer (corresponding to one logical channel) may include a plurality of service data flows (Service Data Flow, SDF) with similar quality of service (Quality of Service, QoS) requirements. A service data flow usually corresponds to a certain application layer service of a user. A traffic filter template (Traffic Filter Template, TFT) performs filtering based on a value of a specific field in TCP/IP to map the service data to a specific dedicated radio bearer. The TFTs of each uplink bearer on a terminal side are provided by a packet data network gateway (Packet Data Network Gateway, PDN-GW).

In the prior art, it is unable to distinguish the P2P services in service requesting phase and the scheduling phase, therefore the P2P services occupy too much uplink air-interface resources and thus the quality of service of other services and even other user services are affected. Particularly, when the P2P service is multiplexed with other services such as http in the same bearer, since the current uplink scheduling of the LTE air-interface takes the radio bearer as the minimum granularity, access stratums (Access Stratum, AS) of both the terminal and the base station are unable to recognize different services in the same bearer, and even unable to recognize the P2P service from a certain radio bearer to control. Consequently, the service performance of other services such as Http declines sharply and the user experience is reduced.

SUMMARY

Embodiments of the present invention provide a method for ensuring uplink quality of service, a base station and a user equipment, so that data is recognized in a dedicated radio bearer and controlled when a centralized scheduling is adopted for uplink resources, thereby ensuring the uplink quality of service.

An embodiment of the present invention provides a method for ensuring uplink quality of service, the method includes:

receiving a downlink service data flow, where the downlink service data flow carries an uplink transmission control identifier;

controlling, based on the uplink transmission control identifier, a transmission of a service type's uplink data for which an uplink transmission control needs to be performed in an uplink radio bearer, so as to reduce a transmission rate of the service type's uplink data.

Another embodiment of the present invention provides a method for ensuring uplink quality of service, the method includes:

acquiring, by a base station, an uplink transmission control identifier;

controlling, by the base station, based on the uplink transmission control identifier, a transmission of a service type's uplink data for which an uplink transmission control needs to be performed in an uplink radio bearer, so as to reduce a transmission rate of the service type's uplink data.

Still another embodiment of the present invention provides a user equipment, including:

a receiving unit, configured to received a downlink service data flow, where the downlink service data flow carries an uplink transmission control identifier;

a control unit, configured to, based on the uplink transmission control identifier, control a transmission of a service type's uplink data for which an uplink transmission control needs to be performed in an uplink radio bearer, so as to reduce a transmission rate of the service type's uplink data.

Still another embodiment of the present invention provides a base station, including:

an acquisition unit, configured to acquire an uplink transmission control identifier;

a control unit, configured to, based on the uplink transmission control identifier, control a transmission of a service type's uplink data for which an uplink transmission control needs to be performed in an uplink radio bearer, so as to reduce a transmission rate of the service type's uplink data.

It can be seen that, in embodiments of the present invention, based on the uplink transmission control identifier, the transmission of a service type's uplink data is controlled, so as to reduce a transmission rate of the service type's uplink data. Therefore, when a centralized scheduling is adopted for uplink resources, the problem that the quality of services of other services are affected because the service type's uplink data occupies too much uplink air-interface resources can be avoided or alleviated, the uplink quality of service is ensured and, thus, the service performance of other services is maintained, and a good user experience is ensured.

BRIEF DESCRIPTION OF DRAWINGS

In order to make the technical solutions of embodiments of the present invention more clear, the accompanying drawings used in the description of embodiments of the present invention are briefly described hereunder. Obviously, the described drawings are merely some embodiments of present invention. For persons skilled in the art, other drawings may be obtained based on these drawings without any creative work.

DESCRIPTION OF EMBODIMENTS

Figure 1:
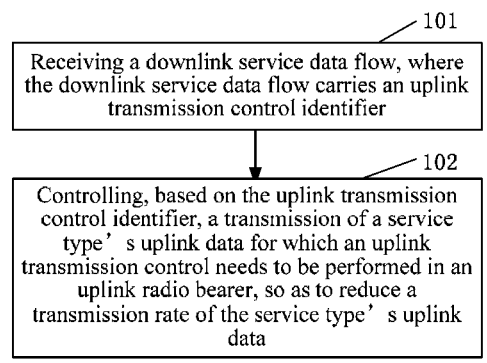
FIG. 1 is a schematic flow chart of a method for ensuring uplink quality of service based on an embodiment of the present invention.

With reference to FIG. 1, embodiments of the present invention provide a method for ensuring uplink quality of service, including:

101, receiving, by a terminal, a downlink service data flow, where the downlink service data flow carries an uplink transmission control identifier.

The downlink service data flow may be from a packet data network gateway (Packet Data Network Gateway, PDN-GW) or a base station in a communication system. The communication system applied to embodiments of the present invention includes but not limits to a long term evolved (Long Term Evolved, LTE) network, a universal mobile telecommunications system (Universal Mobile Telecommunications System, UMTS), a global system of mobile communication (Global System of Mobile Communication, GSM), a worldwide interoperability for microwave access (Worldwide Interoperability for Microwave Access, WiMAX) system, etc. Service types for which the uplink transmission control needs to be performed may be self-defined based on requirements of the network operation and, in particular, are service types affecting normal network services which include but not limit to the P2P service and so forth.

The uplink transmission control identifier may be obtained by a PDN-GW or a base station utilizing a deep packet inspection (DPI) technique to recognize the service type for which the uplink transmission control needs to be performed in the uplink radio bearer.

102, controlling, based on the uplink transmission control identifier, a transmission of a service type's uplink data for which an uplink transmission control needs to be performed in an uplink radio bearer, so as to reduce a transmission rate of the service type's uplink data.

There are many implementation methods for controlling the transmission of the service type's uplink data to reduce the transmission rate of the service type's uplink data diversify:

Alternatively, the methods include: mapping the service type's uplink data to an independent uplink transmission buffer, and reducing a scheduling priority of the service type's uplink data. For this purpose, the methods may include receiving multiple groups of traffic flow templates TFTs and quality of service QoS assigned by the PDN-GW or the base station to a radio bearer carrying the service type's uplink data. A TFT group associated with the service type is mapped to an uplink transmission buffer and corresponds to a group of QoS, and other TFT groups in the multiple groups of the TFTs may be mapped to uplink transmission buffers of their own respectively, and may also be mapped to one uplink transmission buffer jointly.

Alternatively, the methods include: reducing a scheduling priority of a logical channel corresponding to a first data packet of the uplink data; or, reducing a scheduling priority of a logical channel corresponding to the service type's uplink data; or, mapping the service type's uplink data to a dedicated bearer, where the dedicated bearer includes a new radio bearer or a radio bear having been mapped to other service type's uplink data; or, reducing a speed at which the service type's uplink data enters a corresponding uplink transmission buffer.

After step 102, a buffer status report BSR with a granularity of an uplink transmission buffer may be sent to the PDN-GW or a base station.

It can be seen that, in embodiments of the present invention, an uplink transmission control identifier is received, and then, based on the uplink transmission control identifier, the transmission of a service type's uplink data is controlled, so as to reduce a transmission rate of the service type's uplink data. Therefore, the problem that the quality of services of other services are affected because the service type's uplink data occupies too much uplink air-interface resources can be avoided or alleviated, the uplink quality of service is ensured and, thus, the service performance of other services is maintained, and a good user experience is ensured.

Figure 2:
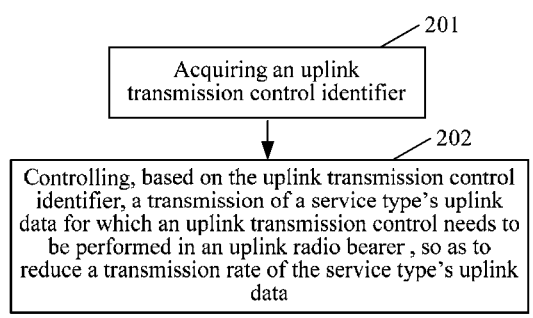
FIG. 2 is a schematic flow chart of a method for ensuring uplink quality of service based on another embodiment of the present invention.

With reference to FIG. 2, embodiments of the present invention provide a method for ensuring uplink quality of service, including:

201, acquiring, by a base station, an uplink transmission control identifier.

The uplink transmission control identifier indicates a service type for which an uplink transmission control needs to be performed. Based on requirements of the network operation, service types for which the uplink transmission control needs to be performed may be self defined, which include but not limit to the P2P service and so forth.

In this step, the uplink transmission control identifier acquired by the base station may be obtained by the base station utilizing the deep packet inspection (DPI) technique to recognize the service type for which the uplink transmission control needs to be performed in the uplink radio bearer.

Or, the base station receives a downlink service data flow from the PDN-GW, where the downlink service data flow carries the uplink transmission control identifier. The uplink transmission control identifier carried in the downlink service data flow from the PDN-GW may be obtained by the PDN-GW utilizing a deep packet inspection DPI technique to recognize the service type for which the uplink transmission control needs to be performed in the uplink radio bearer.

202, controlling, based on the uplink transmission control identifier, a transmission of a service type's uplink data for which an uplink transmission control needs to be performed in an uplink radio bearer, so as to reduce a transmission rate of the service type's uplink data.

There are many implementation methods for controlling the transmission of the service type's uplink data to reduce the transmission rate of the service type's uplink data diversify:

Alternatively, reducing a scheduling priority of a logical channel corresponding to the service type's uplink data, and allocating the logical channel corresponding to the service type's uplink data to a new logical channel group; or, discarding the service type's uplink data; or, discarding a transmission control protocol confirmation identifier in the downlink service data corresponding to the service type's uplink data.

It can be seen that, in embodiments of the present invention, an uplink transmission control identifier is received, and then, based on the uplink transmission control identifier, the transmission of a service type's uplink data is controlled, so as to reduce a transmission rate of the service type's uplink data. Therefore, the problem that the quality of services of other services are affected because the service type's uplink data occupies too much uplink air-interface resources can be avoided or alleviated, the uplink quality of service is ensured and, thus, the service performance of other services is maintained, and a good user experience is ensured.

Figure 3:
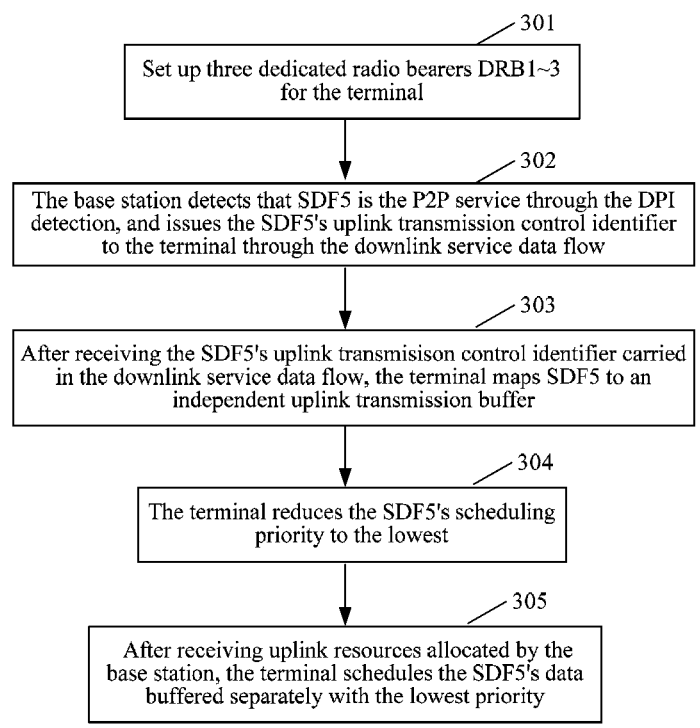
FIG. 3 is a schematic flow chart of a method for ensuring uplink quality of service based on still another embodiment of the present invention.

In order to make the technical solutions provided by embodiments of the present invention more clear, the embodiment as shown in FIG. 3 introduces the above technical solutions provided by the present invention in details:

With reference to FIG. 3, embodiments of present invention provide a method for ensuring uplink quality of service. The method is applicable to that the PDN-GW issues a downlink data flow to the terminal, or applicable to that the base station issues a downlink data flow to the user equipment (hereafter referred as the terminal). In this embodiment, only taking the scenario that the base station issues the downlink data flow to the terminal as an example to explain, other applicable scenarios are similar, and will not be repeated herein. In this embodiment, only taking the scenario that the service type for which the uplink transmission control needs to be performed is the P2P service as an example to explain, and implementation methods of the scenarios that the service types for which the uplink transmission control needs to be performed are other services will not be repeated herein. The method specifically includes:

301, set up three dedicated radio bearers DRB1-3 for the terminal. Service data flows SDF1 and SDF2 are mapped to DRB1 and share one uplink transmission buffer; SDF3 is mapped to DRB2; SDF4 and SDF5 are mapped to DRB3, and share one uplink transmission buffer. SDF5 is a service data flow of the P2P service.

302, the base station detects that SDF5 is the P2P service through the DPI detection, and issues the SDF5's uplink transmission control identifier to the terminal through the downlink service data flow.

Regarding the methods of whether SDF5 issues the uplink transmission control identifier or not, a variety of methods may exist, and the methods may be set based on the actual situation of resource occupation in the network service. Specifically, the uplink transmission control identifier of SDF5 may be issued to the terminal through the downlink service data flow directly when it is detected that SDF5 is the P2P service; or, in further, the uplink transmission control identifier is not issued directly when it is detected that SDF5 is the P2P service, and the uplink transmission control identifier of SDF5 is issued to the terminal through the downlink service data flow after it is detected that the network resources occupied by SDF5 reaches a preset threshold. The methods of whether SDF5 issues the uplink transmission control identifier or not are applicable to each embodiment.

Figure 4:
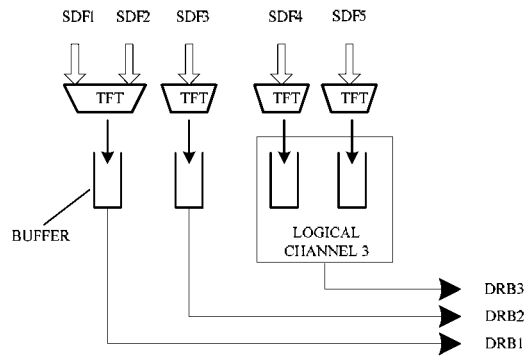
FIG. 4 is a schematic diagram of mapping a service data flow to an independent uplink transmission buffer based on an embodiment of the present invention.

303, after receiving the SDF5's uplink transmission control identifier carried in the downlink service data flow, the terminal maps SDF5 to an independent uplink transmission buffer with reference to FIG. 4.

After receiving the uplink transmission control identifier of SDF5 carried in the downlink service data flow, based on a pre-set configuration, the terminal may map SDF5 to an independent uplink transmission buffer directly. Or, alternatively, the base station notifies the P2P service's traffic flow template (TFT) to the terminal through a signaling and in a new form, which includes but not limits to that the base station issues the SDF5's TFT to the terminal as an independent TFT packet. In this embodiment, the independent TFT packet acts as an uplink transmission control identifier. It is assumed that the traffic flow template corresponding to SDF4 is TFT4, and the traffic flow template corresponding to SDF5 is TFT5. In this embodiment, a bearer update of DRB3 is initiated, and the uplink TFTs are sent to the terminal in the form of TFT groups, for example, {{group 1: TFT4}, {group 2: TFT5} }. The TFT may be issued by adopting a non-access stratum (Non-Access Stratum, NAS) message, and detailed implementation methods may refer to the existing solutions which will not be repeated herein. That is to say, after receiving the above traffic flow templates description, i.e., {{group 1: TFT4}, {group 2: TFT5}}, the terminal maps corresponding uplink service data flows (i.e., SDF5 and SDF4) to independent uplink transmission buffers. The data of SDF5 is detached to the independent uplink transmission buffer, but the logical channel corresponding to SDF5 is not changed. In this implementation method, alternatively, multiple groups of TFTs and QoS may be assigned to the bearer carrying the service type's uplink data to which the uplink transmission control needs to be performed. Each group of TFTs is mapped to one uplink transmission buffer and corresponds to a group of QoS.

Alternatively, step 304 may also be included. The terminal reduces the SDF5'S scheduling priority to the lowest.

305, after receiving uplink resources allocated by the base station, the terminal schedules the SDF5's data buffered separately with the lowest priority.

Further, alternatively, the information of buffering SDF5 may not be included when the terminal reports the uplink transmission buffer status, so as to avoid allocating more uplink resources by the base station which affects the network service experience of other users. Further, alternatively, the existing method for reporting buffer status report (Buffer Status Report, BSR) with a granularity of a logical channel group of the terminal may be optimized and changed to a method for reporting the buffer status report with a granularity of the uplink transmission buffer.

In the method for reporting the BSR with a granularity of the uplink transmission buffer, the buffer status of SDF5 service may be reported separately by extending the current BSR or employing a new layer 2/layer 3 message, thereby enabling the base station to clearly know how much data of each service is waiting for uplink sending, and to perform the targeted allocation of the uplink air-interface resources. The base station may know the priorities of each uplink transmission buffer through the DPI of the base station itself or the PDN-GW, or through an indication of the terminal. Through the DPI of the base station itself or the PDN-GW, the base station may know that whether the scheduling of each uplink buffer performed by the terminal is consistent with the expectation of the base station itself or not. Alternatively, the terminal may also preset different feature fields for each buffer (buffer) (e.g. buffer 1--->tag1, buffer 2--->tag2, buffer 3--->tag 3), and the feature fields are preknown by the base station. When organizing a layer 2 protocol data unit (PDU) for each uplink data, the terminal adds a feature field corresponding to the buffer in the PDU. When receiving an uplink packet, the base station detects the feature fields corresponding to a specific service, and judges whether the scheduling of each service performed by the terminal is consistent with the expectation of the base station itself through the statistics of the feature fields. If the base station detects that the terminal does not perform scheduling as required, for instance, allocating too much resources to a "troublesome" service, the base station may impose a penalty by discarding the data or a corresponding downlink TCP ACK packet.

Figure 5:
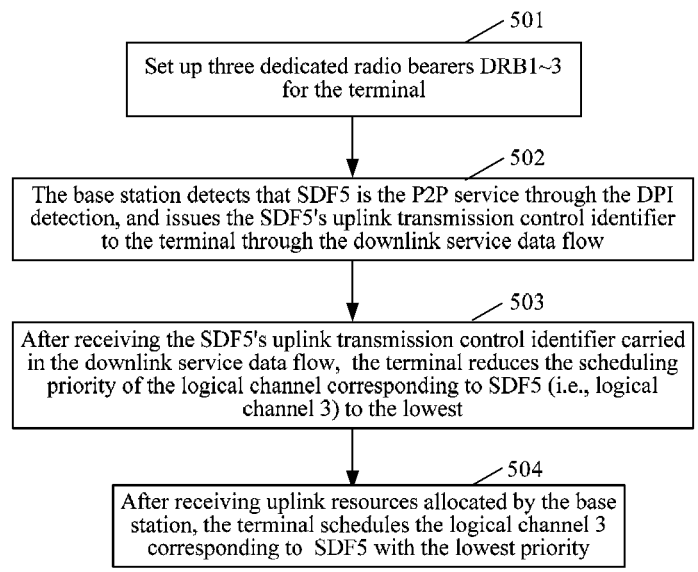
FIG. 5 is a schematic flow chart of a method for ensuring uplink quality of service based on an embodiment of the present invention.

With reference to FIG. 5, embodiments of the present invention provide a method for ensuring uplink quality of service. The method is applicable to that the PDN-GW issues a downlink data flow to the terminal, or applicable to that the base station issues the downlink data flow to the user equipment (hereafter referred as the terminal). In this embodiment, only taking the scenario that the base station issues the downlink data flow to the terminal as an example to explain, other applicable scenarios are similar, and will not be repeated herein. In this embodiment, only taking the scenario that the service type for which the uplink transmission control needs to be performed is the P2P service as an example to explain, and implementation methods of the scenarios that the service types for which the uplink transmission control needs to be performed are other services will not be repeated herein. The method specifically includes:

Steps 501-502, which are similar with steps 301-302, and will not be repeated herein.

503, after receiving the SDF5's uplink transmission control identifier carried in the downlink service data flow, the terminal reduces the scheduling priority of the logical channel corresponding to SDF5 (i.e., logical channel 3) to the lowest.

Alternatively, in order to ensure that both sides of the base station and the terminal adopt a same scheduling priority for the logical channel 3, the terminal may change the scheduling priority of logical channel 3 firstly, and then notifies the base station; or the terminal may change the scheduling priority of logical channel 3 based on a signaling of the base station. The signaling may be a radio resource control protocol (Radio Resource Control, RRC) signaling.

504, after receiving uplink resources allocated by the base station, the terminal schedules the logical channel 3 corresponding to SDF5 with the lowest priority.

In order to make the technical solutions provided by this embodiment more clear, this embodiment is described in details hereafter:

When the bearer is set up, the priority of logical channel has been determined. The terminal utilizes the priority to reallocate the uplink air-interface resources allocated by the base station among different logical channels. The priority is the same for all service data in a same DRB, and differentiated treatments to different services are not given. In T1 time, the P2P service accounts for 20% of the entire bandwidth, the http service accounts for 60%, and other services account for 20%. In order to give priority to the http service, the base station sets the priority of the entire logical channel as "normal" and notifies the terminal. However, in T2 time, the P2P service accounts for 70%, the http service accounts for 10%, and other services account for 20%. In order to show a restriction to the P2P service, the base station sets a low priority to the entire logical channel carrying P2P service, and notifies the terminal. In addition to using a signaling to notify the terminal to adjust the priority of the logical channel, the base station may also carry the normal and low priority information in a downlink data packet to notify. In this embodiment, the priority of the entire logical channel carrying the P2P service acts as an uplink transmission control identifier. Specifically, bits in differentiated services codepoint (Differentiated Services Codepoint, DSCP) in the type of service (Type Of Service, TOS) field of the IP header may be used to identify. A Tos field structure is shown in Table 1, and a Tos field structure carrying the priority information is shown in Table 2. CU in Table 1 indicates currently unused field (Currently Unused), which may be used as an explicit congestion notification (Explicit Congestion Notification, ECN).

TABLE 1

| 0 | 1 | 2 | 3 | 4 | 5 | 6 | 7 |
|---|---|---|---|---|---|---|---|
| | | DSCP | | | | CU | |

TABLE 2

| 1 | X | X | X | X | X | X | X |
|---|---|---|---|---|---|---|---|
| ←Low Priority→ | | | | | ←Reserved→ | | |

Specifically, a first bit in the DSCP may be used to identify the priority of the logical channel (uplink transmission control identifier), where 0 indicates a normal priority and 1 indicates a low priority, and is carried in a packet header field of the downlink data packet. In this case, after receiving the downlink data packet, the terminal adjusts the priority of the corresponding logical channel (reduce or reinstate). In order to refine the uplink control, a plurality of bits in the DSCP may also be used to identify the priorities of the logical channels, e.g. 3 bits are used to identify 8 priorities. The terminal adjusts the scheduling priorities of corresponding uplink logical channels directly based on the carried priorities.

Figure 6:
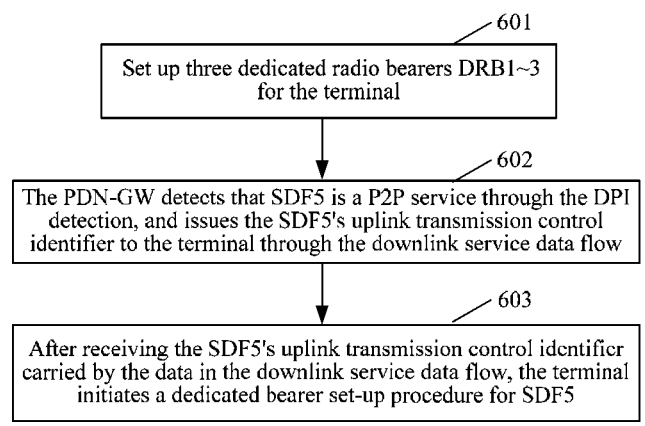
FIG. 6 is a schematic flow chart of a method for ensuring uplink quality of service based on another embodiment of the present invention.

With reference to FIG. 6, embodiments of the present invention provide a method for ensuring uplink quality of service. The method is applicable to that the PDN-GW issues a downlink data flow to the terminal, or applicable to that the base station issues a downlink data flow to the user equipment (hereafter referred as the terminal). In this embodiment, only taking the scenario that the PDN-GW issues the downlink data flow to the terminal as an example to explain, other applicable scenarios are similar, and will not be repeated herein. In this embodiment, only taking the scenario that the service type for which the uplink transmission control needs to be performed is the P2P service as an example to explain, and implementation methods of the scenarios that the service types for which the uplink transmission control needs to be performed are other services will not be repeated herein. The method specifically includes:

Step 601, which is similar with the step 301, and will not be repeated herein.

602, the PDN-GW detects that SDF5 is a P2P service through the DPI detection, and issues the SDF5's uplink transmission control identifier to the terminal through the downlink service data flow.

603, after receiving the SDF5's uplink transmission control identifier carried by the data in the downlink service data flow, the terminal initiates a dedicated bearer set-up procedure for SDF5.

Alternatively, the set up dedicated bearer maps SDF5 to a new radio bearer, or maps SDF5 to a radio bear which has been mapped to other service data of the same service type as SDF5.

Figure 7:
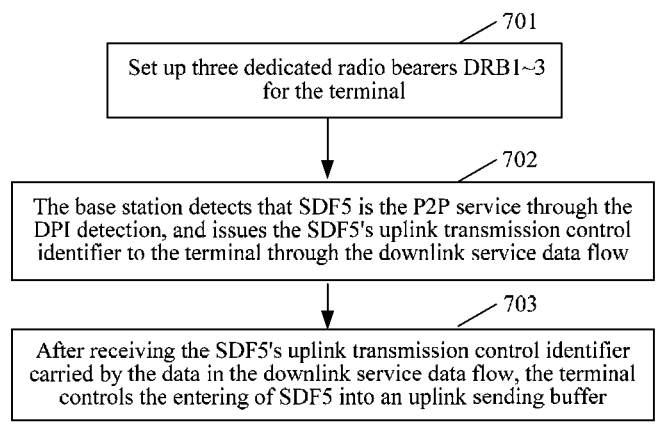
FIG. 7 is a schematic flow chart of a method for ensuring uplink quality of service based on still another embodiment of the present invention.

With reference to FIG. 7, embodiments of the present invention provide a method for ensuring uplink quality of service. The method is applicable to that the PDN-GW issues a downlink data flow to the terminal, or applicable to that the base station issues a downlink data flow to the user equipment (hereafter referred as the terminal). In this embodiment, only taking the scenario that the base station issues the downlink data flow to the terminal as an example to explain, other applicable scenarios are similar, and will not be repeated herein. In this embodiment, only taking the scenario that the service type for which the uplink transmission control needs to be performed is the P2P service as an example to explain; implementation methods of the scenarios that the service types for which the uplink transmission control needs to be performed are other services will not be repeated herein. The method specifically includes:

Steps 701-702, which are similar with the steps 301-302, and will not be repeated herein.

703, after receiving the SDF5's uplink transmission control identifier carried by the data in the downlink service data flow, the terminal controls the entering of SDF5 into an uplink transmission buffer.

Specifically, the terminal may control the entering of SDF5 into the uplink transmission buffer through the SDF5's TFT carried in a NAS layer application or the SDF5's TFT obtained by its own by classifying service flow data. Controlling the entering of SDF5 data into the uplink transmission buffer may be stopping the entering of SDF5 into the uplink transmission buffer, may also be reducing the speed at which SDF5 enters the uplink transmission buffer, and may also be discarding all or part of downlink TCP ACK packets corresponding to SDF5.

Figure 8:
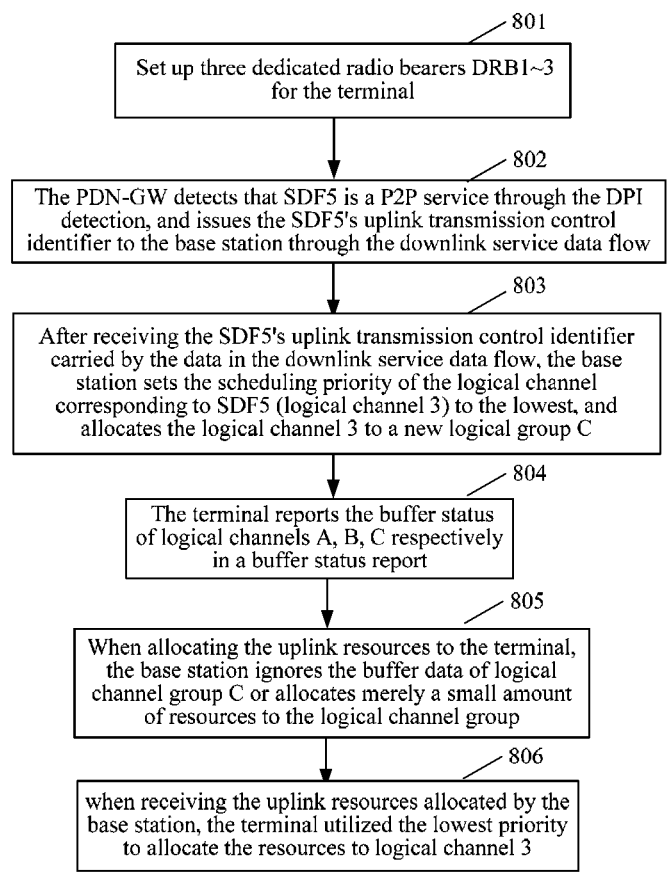
FIG. 8 is a schematic flow chart of a method for ensuring uplink quality of service based on still another embodiment of the present invention.

With reference to FIG. 8, embodiments of the present invention provide a method for ensuring uplink quality of service. The method is applicable to that the PDN-GW issues a downlink data flow to the base station. In this embodiment, only taking the scenario that the service type for which the uplink transmission control needs to be performed is the P2P service as an example to explain, and implementation methods of the scenarios that the service types for which the uplink transmission control needs to be performed are other services will not be repeated herein. The method specifically includes:

Step 801, which is similar with the step 301, and will not be repeated herein. It is assumed that a logical channel 1 belongs to a logical channel group A, and logical channels 2 and 3 belong to a logical channel group B.

802, the PDN-GW detects that SDF5 is a P2P service through the DPI detection, and issues the SDF5's uplink transmission control identifier to the base station through the downlink service data flow.

Alternatively, the base station may detect that SDF5 is the P2P service through the DPI detection by itself, rather than employ the PDN-GW to perform the DPI detection.

803, after receiving the SDF5's uplink transmission control identifier carried by the data in the downlink service data flow, the base station sets the scheduling priority of the logical channel corresponding to SDF5 (logical channel 3) to the lowest, and allocates the logical channel 3 to a new logical group C and, then, notifies the terminal through an RRC configuration signaling.

804, the terminal reports the buffer status of logical channels A, B, C respectively in a buffer status report.

Alternatively, after the step 804, the method may further include:

805, when allocating the uplink resources to the terminal, the base station ignores the buffer data of logical channel group C or allocates merely a small amount of resources to the logical channel group, for example, which satisfies the resources required for ensuring bite rate (PBR).

806, when receiving the uplink resources allocated by the base station, the terminal utilized the lowest priority to allocate the resources to logical channel 3.

Figure 9:
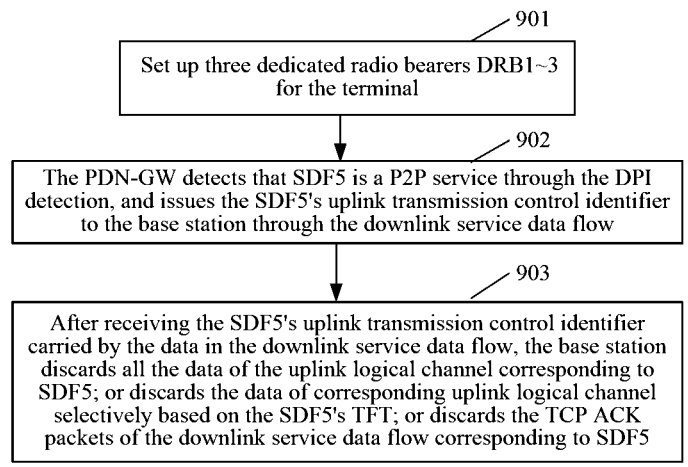
FIG. 9 is a schematic flow chart of a method for ensuring uplink quality of service based on still another embodiment of the present invention.

With reference to FIG. 9, embodiments of the present invention provide a method for ensuring uplink quality of service. The method is applicable to that the PDN-GW issues a downlink data flow to the base station. In this embodiment, only taking the scenario that the service type for which the uplink transmission control needs to be performed is the P2P service as an example to explain, and implementation methods of the scenarios that the service types for which the uplink transmission control needs to be performed are other services will not be given herein. The method specifically includes:

Step 901, which is similar with the step 301, and will not be repeated herein.

902, the PDN-GW detects that SDF5 is a P2P service through the DPI detection, and issues the SDF5's uplink transmission control identifier to the base station through the downlink service data flow.

Alternatively, the PDN-GW carries the SDF5's TFT in the downlink service data flow. Alternatively, the base station may detect that SDF5 is the P2P service through the DPI detection by itself, rather than employ the PDN-GW to perform the DPI detection.

903, after receiving the SDF5's uplink transmission control identifier carried by the data in the downlink service data flow, the base station discards all the data of the uplink logical channel corresponding to SDF5; or discards the data of corresponding uplink logical channel selectively based on the SDF5's TFT, that is, only discards the data packets of SDF5; or discards the TCP ACK packets of the downlink service data flow corresponding to SDF5. The base station may recognize the downlink TCP ACK packets of SDF5 by adopting the DPI detection technique.

Further, alternatively, in step 902, PDN-GW doesn't need to issue the SDF5's uplink transmission control identifier to the base station through the downlink service data flow. Correspondingly, step 903 is developed to that the PDN-GW discards the uplink data of SDF5 or the corresponding downlink TCP ACK directly.

Figure 10:
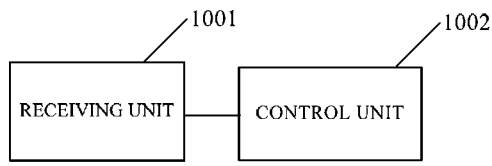
FIG. 10 is a schematic structural diagram of a user equipment based on an embodiment of the present invention.

With reference to FIG. 10, embodiments of the present invention provides a user equipment, including:

a receiving unit 1001, configured to receive a downlink service data flow, where the downlink service data flow carries an uplink transmission control identifier.

The uplink transmission control identifier is obtained by a PDN-GW or a base station utilizing a deep packet inspection DPI technique to recognize the service type for which the uplink transmission control needs to be performed in the uplink radio bearer.

The downlink service data flow may be from a packet data network gateway (Packet Data Network Gateway, PDN-GW) or a base station in a communication system. The communication system applied to embodiments of the present invention includes but not limits to the systems such as the LTE, the UMTS, the GSM and the WiMAX. Service types for which the uplink transmission control needs to be performed may be self defined based on requirements of the network operation, and include but not limit to the P2P service and so forth.

a control unit 1002, configured to, based on the uplink transmission control identifier, control a transmission of a service type's uplink data for which an uplink transmission control needs to be performed in an uplink radio bearer, so as to reduce a transmission rate of the service type's uplink data.

Alternatively, in order to be applicable to different implementation methods for controlling the transmission of the service type's uplink data, in one implementation method, the control unit is further configured to map the service type's uplink data to an independent uplink transmission buffer, and reduce a scheduling priority of the service type's uplink data. For this purpose, the receiving unit is further configured to receive multiple groups of traffic flow templates TFTs and quality of service QoS assigned by the PDN-GW or the base station to a radio bearer carrying the service type's uplink data. A TFT group associated with the service type is mapped to an uplink transmission buffer and corresponds to a group of QoS.

In other different implementation methods for controlling, based on the uplink transmission control identifier, the transmission of the service type's uplink data so as to reduce the transmission rate of the service type's uplink data, alternatively: the control unit is further configured to reduce a scheduling priority of a logical channel corresponding to the service type's uplink data. Or, the control unit is further configured to map the service type's uplink data to a dedicated bearer. Or, the control unit is further configured to reduce a speed at which the service type's uplink data enters a corresponding uplink transmission buffer. In particular, the control unit is further configured to reduce the speed at which the service type's uplink data enters the corresponding uplink transmission buffer through a service type's TFT carried by a NAS layer application or through a service type's TFT obtained by classifying service flow data.

Alternatively, the user equipment further includes: a sending unit, configured to send a buffer status report BSR with a granularity of the uplink transmission buffer to a PDN-GW or a base station.

Persons skilled in the art can understand that the user equipment in this embodiment may be the terminal in the foregoing method embodiments. Therefore, this embodiment and the foregoing method embodiments can combine with each other, and will not be repeated herein.

It can be seen that, in embodiments of the present invention, the user equipment receives an uplink transmission control identifier, and then, based on the uplink transmission control identifier, controls the transmission of a service type's uplink data to reduce a transmission rate of the service type's uplink data. Therefore, the problem that the quality of services of other services are affected because the service type's uplink data occupies too much uplink air-interface resources can be avoided or alleviated, the uplink quality of service is ensured and, thus, the service performance of other services is maintained, and a good user experience is ensured.

Figure 11:
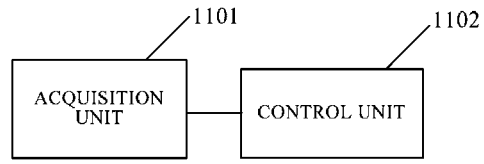
FIG. 11 is a schematic structural diagram of a base station based on an embodiment of the present invention.

With reference to FIG. 11, embodiments of the present invention provide a base station, including:

an acquisition unit 1101, configured to acquire an uplink transmission control identifier.

The acquisition unit may acquire the uplink transmission control identifier based on multiple methods. Alternatively, the acquisition unit may include a receiving sub-unit. The receiving sub-unit is configured to receive a downlink service data flow from a packet data network gateway PDN-GW, where the downlink service data flow carries the uplink transmission control identifier. The uplink transmission control identifier is obtained by the PDN-GW utilizing a deep packet inspection DPI technique to recognize the service type for which the uplink transmission control needs to be performed in the uplink radio bearer. Or, alternatively, the acquisition unit is further configured to obtain the uplink transmission control identifier by utilizing the deep packet inspection DPI technique to recognize the service type for which the uplink transmission control needs to be performed in the uplink radio bearer.

a control unit 1102, configured to, based on the uplink transmission control identifier, control a transmission of a service type's uplink data for which an uplink transmission control needs to be performed in an uplink radio bearer, so as to reduce a transmission rate of the service type's uplink data.

The base station based on embodiments of the present invention may be applicable to communication systems which include but not limit to the LTE, the UMTS, the GSM, the WiMAX, etc. The service types for which the uplink transmission control needs to be performed may be self defined based on requirements of the network operation, and include but not limit to the P2P service and so forth.

Alternatively, in order to be applicable to different implementation methods for controlling the transmission of the service type's uplink data, the following methods may be adopted, which includes but not limits to: the control unit is further configured to reduce a scheduling priority of a logical channel corresponding to the service type's uplink data and to allocate the logical channel corresponding to the service type's uplink data to a new logical channel group. Or, the control unit is further configured to discard the service type's uplink data. Or, the control unit is further configured to discard a transmission control protocol confirmation identifier in downlink service data corresponding to the service type's uplink data.

Persons skilled in the art can understand that the base station in this embodiment may be the base station in the foregoing method embodiments. Therefore, this embodiment and the foregoing method embodiments can combine with each other, and will not be repeated herein.

It can be seen that, in embodiments of the present invention, the base station acquires an uplink transmission control identifier, and then controls, based on the uplink transmission control identifier, the transmission of a service type's uplink data to reduce a transmission rate of the service type's uplink data. Therefore, the problem that the quality of services of other services are affected because the service type's uplink data occupies too much uplink air-interface resources can be avoided or alleviated, the uplink quality of service is ensured and, thus, the service performance of other services is maintained, and a good user experience is ensured.

Persons skilled in the art can understand that all or a part of the steps of the methods based on embodiments of the present invention may be implemented by a program instructing relevant hardware (such as a processor). The program may be stored in a computer readable storage medium. When the program runs, the steps of the methods based on the foregoing embodiments are performed. The storage medium may be a disk, a CD, a read-only memory (Read-Only Memory, ROM), or a random access memory (Random Access Memory, RAM), etc.

Detailed above are the technical solutions based on embodiments of the present invention. Several examples are used for illustration of the principles and implementation methods of the present invention. The description about the above embodiments is only for facilitating the understanding of the method and its core ideas of the present invention. Persons skilled in the art can make modifications to the specific implementation methods and application scope based on the core ideas of the present invention. In conclusion, the contents in this description should not be interpreted as limitation to the present invention.

What is claimed is:

1. A method for ensuring uplink quality of a service, the method comprising:
receiving, by a user equipment (UE), a downlink service data flow, wherein the downlink service data flow carries an uplink transmission control identifier indicating a service type for an uplink transmission control in an uplink radio bearer, wherein the uplink transmission control identifier is used for reducing a resource occupation of the service type's uplink data in the uplink radio bearer so as to control transmission of the service type's uplink data; and
controlling, by the UE, based on the uplink transmission control identifier, the transmission of the service type's uplink data, wherein the controlling comprises one of:
(a) mapping, by the UE, the service type's uplink data to an independent uplink transmission buffer, and reducing, by the UE, a scheduling priority of the service type's uplink data;
(b) reducing, by the UE, a scheduling priority of a logical channel associated with the service type's uplink data; and
(c) reducing, by the UE, a speed at which the service type's uplink data enters a corresponding uplink transmission buffer.

2. The method according to claim 1, wherein:
mapping, by the UE, the service type's uplink data to the independent uplink transmission buffer, or reducing, by the UE, the scheduling priority of the service type's uplink data, comprises: receiving, by the UE, one or multiple groups of traffic flow templates (TFTs) and quality of service (QoS) assigned by a packet data network gateway (PDN-GW) or a base station to a radio bearer carrying the service type's uplink data, and a TFT group associated with the service type is mapped to an uplink transmission buffer and corresponds to a group of QoS.

3. The method according to claim 1 further comprising: sending, by the UE, a buffer status report (BSR) with a granularity of the uplink transmission buffer to a packet data network gateway (PDN-GW) or a base station.

4. The method according to claim 1, wherein, the reducing, by the UE, the speed at which the service type's uplink data enters the corresponding uplink transmission buffer comprises:
reducing, by the UE, the speed at which the service type's uplink data enters the corresponding uplink transmission buffer through a service type's traffic flow template (TFT) carried by a non-access stratum (NAS) layer application or through the service type's TFT obtained by classifying service flow data.

5. The method according to claim 1, wherein controlling the transmission of the service type's uplink data includes mapping the service type's uplink data to a new radio bearer or an existing radio bearer, and the existing radio bearer has been mapped to other service type's uplink data for which the uplink transmission control needs to be performed.

6. A user equipment comprising:
a receiver configured to received a downlink service data flow, wherein the downlink service data flow carries an uplink transmission control identifier indicating a service type for an uplink transmission control in an uplink radio bearer, wherein the uplink transmission control identifier is used for reducing a resource occupation of the service type's uplink data in the uplink radio bearer so as to control transmission of the service type's uplink data; and
a processor configured to control the transmission of the service type's uplink data based on the uplink transmission control identifier and further configured to provide one of the following:
(a) map the service type's uplink data to an independent uplink transmission buffer, and reduce a scheduling priority of the service type's uplink data;
(b) reduce a scheduling priority of a logical channel associated with the service type's uplink data;

(c) map the service type's uplink data to a dedicated radio bearer; and (d) reduce a speed at which the service type's uplink data enters a corresponding uplink transmission buffer.

7. The user equipment according to claim 6, wherein:
the receiver is further configured to receive one or multiple groups of traffic flow templates (TFTs) and quality of service (QoS) assigned by a packet data network gateway (PDN-GW) or a base station to a radio bearer carrying the service type's uplink data, and a TFT group associated with the service type is mapped to an uplink transmission buffer and corresponds to a group of QoS.

8. The user equipment according to claim 6, wherein the user equipment further comprises a transmitter configured to send a buffer status report (BSR) with a granularity of the uplink transmission buffer to a packet data network gateway (PDN-GW) or a base station.

9. The user equipment according to claim 8, wherein the processor is further configured to reduce the speed at which the service type's uplink data enters the corresponding uplink transmission buffer through a service type's traffic flow template (TFT) carried by a non-access stratum (NAS) layer application or through the service type's TFT obtained by classifying service flow data.

10. The user equipment according to claim 6, wherein:
the uplink transmission control identifier is obtained by a packet data network gateway (PDN-GW) or a base station utilizing a deep packet inspection (DPI) technique to recognize the service type for which the uplink transmission control needs to be performed in the uplink radio bearer.

11. A base station comprising:
a receiver configured to receive a downlink service data flow from a packet data network gateway (PDN-GW) and acquire from the downlink service data flow an uplink transmission control identifier indicating a service type for an uplink transmission control in an uplink radio bearer, wherein the uplink transmission control identifier is used for reducing a resource occupation of the service type's uplink data in the uplink radio bearer so as to control transmission rate of the service type's uplink data; and a processor configured to control the transmission of the service type's uplink data, based on the uplink transmission control identifier, by reducing a scheduling priority of a logical channel corresponding to the service type's uplink data, and allocating the logical channel corresponding to the service type's uplink data to a new logical channel group.

12. The base station according to claim 11, wherein:
the uplink transmission control identifier is obtained by the PDN-GW utilizing a deep packet inspection (DPI) technique to recognize the service type for which the uplink transmission control needs to be performed in the uplink radio bearer.

\* \* \* \* \*

UNITED STATES PATENT AND TRADEMARK OFFICE
CERTIFICATE OF CORRECTION

PATENT NO. : 9,717,016 B2  
APPLICATION NO. : 14/153915  
DATED : July 25, 2017  
INVENTOR(S) : Zeng et al.

Page 1 of 1

It is certified that error appears in the above-identified patent and that said Letters Patent is hereby corrected as shown below:

In the Claims

Column 16, Line 13, "transmission rate of the" should read -- transmission of the --.

Signed and Sealed this  
Thirteenth Day of March, 2018

Andrei Iancu  
*Director of the United States Patent and Trademark Office*